United States Patent
Tan et al.

(10) Patent No.: US 9,427,701 B2
(45) Date of Patent: Aug. 30, 2016

(54) DEHUMIDIFIER APPARATUS

(71) Applicant: Hisense Kelon Electrical Holdings Co. Ltd., Foshan (CN)

(72) Inventors: Yufeng Tan, Foshan (CN); Wei Tang, Foshan (CN); Xiaoqin Wei, Foshan (CN); Minzhu Huang, Foshan (CN); Bingxiang Liang, Foshan (CN); Zhongmin Liu, Foshan (CN)

(73) Assignees: HISENSE KELON ELECTRICAL HOLDINGS CO., LTD., Foshan (CN); GUANGDONG KELON AIR CONDITIONER CO., LTD., Foshan (CN)

( * ) Notice: Subject to any disclaimer, the term of this patent is extended or adjusted under 35 U.S.C. 154(b) by 0 days.

(21) Appl. No.: 14/988,274

(22) Filed: Jan. 5, 2016

(65) Prior Publication Data

US 2016/0129391 A1    May 12, 2016

Related U.S. Application Data

(62) Division of application No. 13/858,766, filed on Apr. 8, 2013, now Pat. No. 9,278,309.

(30) Foreign Application Priority Data

Dec. 25, 2012 (CN) .......................... 2012 1 0568907

(51) Int. Cl.
*B01D 53/26* (2006.01)
*B01D 5/00* (2006.01)

(52) U.S. Cl.
CPC ............... *B01D 53/265* (2013.01); *B01D 5/00* (2013.01); *Y10T 137/86035* (2015.04)

(58) Field of Classification Search
None
See application file for complete search history.

(56) References Cited

U.S. PATENT DOCUMENTS

| | | | |
|---|---|---|---|
| 6,370,902 B1 | 4/2002 | De'Longhi | |
| 2008/0282704 A1* | 11/2008 | Shalom | F24F 3/14 62/3.4 |
| 2010/0000242 A1 | 1/2010 | Chiu | |
| 2010/0071399 A1 | 3/2010 | Yoon | |
| 2011/0016904 A1 | 1/2011 | Yoon | |

FOREIGN PATENT DOCUMENTS

| | | | |
|---|---|---|---|
| CN | 200958840 Y | * | 10/2007 |
| CN | 202815611 U | | 3/2013 |
| CN | 203165796 U | | 8/2013 |

OTHER PUBLICATIONS

Translation of CN200958840Y, accessed Feb. 17, 2016.*

* cited by examiner

*Primary Examiner* — Duane Smith
*Assistant Examiner* — Phillip Shao
(74) *Attorney, Agent, or Firm* — Maier & Maier, PLLC

(57) ABSTRACT

A dehumidifier is disclosed comprising a base, a fast coupler disposed on the base, a water receiving tray, a water collection tank disposed below the water receiving tray, a water discharging tank connected to the water receiving tray, and a pump having an outlet connected to the fast coupler and an inlet connected to the water discharging tank, wherein a water level switch is provided in the water discharging tank and comprises a floater and a closed hollow rod, wherein the floater has a hole for passing through of the rod and a magnet, and the rod has a magnetic field response switch electrically connected with the pump.

3 Claims, 7 Drawing Sheets even full of the water collecting tank. The monitoring system comprises a controller connected to the pump, a temperature sensor connected with the pump for detecting the temperature of the pump, and a pressure sensor connected to the outlet of the pump for detecting the pressure of the water at the outlet.

DEHUMIDIFIER APPARATUS

RELATED APPLICATIONS

This application is a divisional of application Ser. No. 13/858,766 filed Apr. 8, 2013, and published as Pub. No. 2014/0174289, which claims priority under 35 U.S.C. §119 to Chinese Patent Application No. 201210568907.9, filed Dec. 25, 2012, the disclosures of which are incorporated by reference herein in their entirety.

FIELD OF THE INVENTION

The present invention relates to a dehumidifier apparatus and, in particular, to a dehumidifier that is incorporated with a monitoring system.

BACKGROUND OF THE INVENTION

Conventionally available dehumidifiers generally comprise, among other, an evaporator, a water receiving tray disposed under the evaporator, a water discharging tank, and a fast coupler in fluid communication with the water discharging tank. When the environmental air passes by the evaporator which has lower temperature than the air, the water vapor contained in the air will be condensed to form water drip and flows into the water receiving tray under the evaporator.

The water can be discharged in many ways. One of the ways is to use the water discharging tank into which the condensed water in the water receiving tray flows. Once the water discharging tank is almost completely filled, the tank will be manually removed and the water contained therein is discharged. In this case, as the volume of the tank is limited, one has to repeatedly to remove and place the tank every 6-8 hours, which is very inconvenient.

Alternatively, the water can be discharge in real time. In this case, an additional drainage pipe is used to connect to the outlet of a drainage coupler. The drainage coupler is located under the water receiving tray and in fluid communication therewith. The condensed water is continuously drained whenever it flows into the water receiving tray. A shortcoming of this approach is that, because the water is discharged by its gravity, it can not be discharged to a position with higher attitude than the drainage coupler. This is undesirable for those who use the dehumidifier in a basement.

There is another approach to discharge the water, i.e, by using a pump. The pump is always mounted below the water discharging tank and communicated between the discharging tank and the fast coupler. However, pump-equipped dehumidifiers available on the market suffer from one or more of the following shortcomings.

In one circumstance, the actuation of the pump is controlled by a micro-switch which, in turn, is controlled to switch on/off by a floater disposed in the discharging tank. The floater is connected with a spring blade of the micro-switch through a connecting rod. When the water rises to a predetermined level, the floater actuates the micro-switch to switch on through the connecting rod. Because the floater is normally made of foam materials and always soaked in the condensed water, the weight of the floater is increased due to water absorption of the foam materials. The sensitivity of the control of micro-switch by the floater is thus decreased. In addition, the spring blade of the micro-switch is prone to become rusty due to the wet environment where the micro-switch locates.

In another case, the pump is directly connected to the water discharging tank through a water pipe. The pump is subjected to blockage and failure when something is unexpectedly entered into the receiving tray and then the discharging tank and finally the pump. Additionally, the pump is always exposed outside, which imposes a high safety challenge because large amount of heat will be generated in operation.

In some other dehumidifiers, the pump is only actuated when two conditions are fulfilled, one of which is switch-on of the micro-switch, and the other is open status of the fast coupler. This is done for purpose of prevention from misoperation. However, it is in the meantime inconvenient for one to actuate the pump.

SUMMARY OF THE INVENTION

One object of the present invention is to provide a dehumidifier that is safe, reliable and easy to operate.

To achieve the object, a dehumidifier is provided which comprises a base, a fast coupler disposed on the base, a water receiving tray, a water collection tank disposed below the water receiving tray, a water discharging tank connected to the water receiving tray, and a pump having an outlet connected to the fast coupler and an inlet connected to the water discharging tank, wherein a water level switch is provided in the water discharging tank and comprises a floater and a closed hollow rod, wherein the floater has a hole for passing through of the rod and a magnet, and the rod has a magnetic field response switch electrically connected with the pump.

In one embodiment, the pump is provided with a temperature control device having a temperature sensor consisted of, for example, thermistors. The temperature sensor collects the value of temperature of the pump in operation and sends a signal to switch off the pump when the value is equal or greater than a threshold and to switch on the pump when the value is less than the threshold.

In one embodiment, the dehumidifier is provided with a protective casing for accommodating the pump. The protective casing is provided with openings for access of the outlet and inlet of the pump. Preferably, shock-absorbing cushions are provided at the openings.

In one embodiment, a filtrating member is provided at the interface between the water discharging tank and the water receiving tray. Preferably, the discharging tank is provided with a drainage opening.

In another embodiment, a tank opening is provided in the water receiving tray, which is in fluid communication with a direct drainage opening. The water collecting tank is disposed below the direct drainage opening to collect water flowing out of the direct drainage opening.

In one embodiment, the floater is made of foamed plastics, such as styrene foam.

In one embodiment, the dehumidifier has a control system engaged with the water collecting tank for controlling the switch on/off status of the dehumidifier. The control system comprises a float rod with one end extended in the water collecting tank and the other end attached to a touching rod, and a micro-switch. The touching rod attaches to the micro-switch to switch it on and detaches from the micro-switch to switch it off, such that the dehumidifier is correspondingly switched on and off.

In one embodiment, the dehumidifier further comprises a monitoring system for the pump for protecting the latter under abnormal operation conditions including connection failures between parts, blockage of the filtrating member or leakage of pipes. If an abnormal operation condition is determined, the pump will be automatically stopped. The monitoring system comprises a signal receiving module for receiving 'on' and 'off' signals of the water level switch; a timing module coupled with the signal receiving module and starting to count when the 'on' signal of the water level switch is received and stopping counting when the 'off' signal is received; a data analysis module for receiving the timing data transmitted from the timing module and send a power-off signal when the timing data is greater than a threshold value X; and a pump control module for receiving the power-off signal and stopping the pump.

In one embodiment, a method for controlling a dehumidifier is disclosed which comprises steps of: (a) providing a dehumidifier having a water level switch and pump, as described above; (b) when water in a water discharging tank reaches a predetermined level, the water level switch is switched on and the pump is started; (c) connecting the fast coupler with a drainage coupler; and (d) the dehumidifier starts to discharge water.

In one embodiment, the method comprises a step of stopping the pump when the temperature of the pump is in excess of a predetermined value. In addition or alternatively, the method further comprises a step of stopping the pump when the pump is operated over a predetermined time. Therefore, if any abnormal condition occurs, the pump will be stopped as early as possible to protect it from damage.

The present invention has the following advantages. The magnetic field response switch is disposed within a closed hollow rod such that it is separated from the wet environment which possibly causes rusty of the magnetic field response switch, the reliability and sensitivity thereof is thus enhanced. In addition, the floater is made from foamed plastics which have low water absorption. The floater is able to keep its weight constantly over a long time, overcoming the deficiencies of conventional arts.

The filtering member provided at the interface between the water discharging tank and the water receiving tray is able to preventing articles entering into the pump. A cover can be provided over the filtering member to facilitate checking and removal of any articles that is blocked by the member.

The pump is shielded by the protective casing to prevent the dehumidifier from possible damage caused by fire due to for example short circuit of the pump. The pump is turn on as long as the water level switch is switched on. On the other hand, the pump is protected from damage by various steps involved in the monitoring system.

BRIEF DESCRIPTION OF THE DRAWINGS

Further advantages and details of the present invention emerge from the example embodiments described below, which do not limit the invention in any way, and from the drawings, in which.

Figure 1:
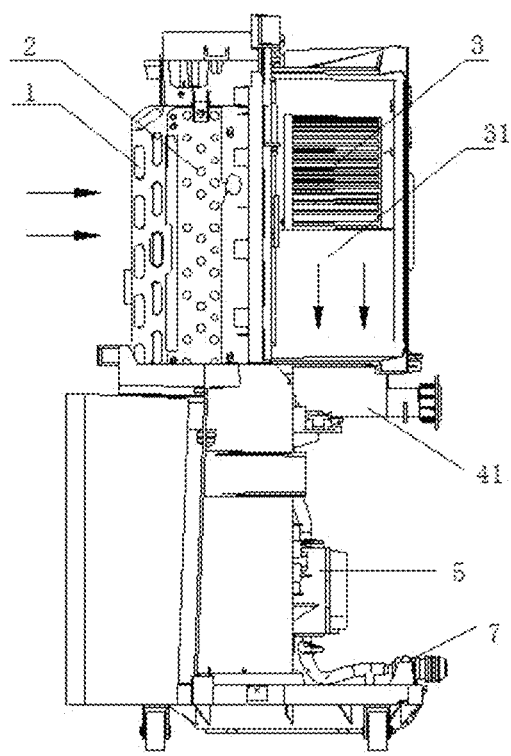
FIG. 1 is a schematic view of an exemplary dehumidifier according to one embodiment of the present invention.

Elements that are irrelevant to the spirit of the present invention are omitted for clarity.

DETAILED DESCRIPTION OF THE INVENTION

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" include any and all combinations of one or more of the associated listed items. It will be further understood that the terms "comprises" "comprising" "includes" and/or "including" when used herein, specify the presence of stated features, integers, steps, operations, elements, and/or components, but do not preclude the presence or addition of one or more other features, integers, steps, operations, elements, components, and/or groups thereof.

Example 1

An exemplary dehumidifier is shown in FIGS. 1 to 4, comprising a base 10, an evaporator 1 and a condenser 2 arranged in parallel, a fan 3 and a water receiving tray 4, the evaporator 1 being located outside to the condenser 2 and the fan 3 being located inside to the condenser 2. The water receiving tray 4 is disposed below the condenser 2. The arrows indicate air flow direction. In use, the air passes by the evaporator 1 and condenser 2 in sequence and finally flow through the air passage 31. When the air passes by the evaporator 1 which has lower temperature, the water vapor contained in the air will condensed to form water drips. The water drips drip into the water receiving tray 4. The air will then pass by the condenser 2 which has higher temperature and flow through the air passage 31 out of the dehumidifier.

Figure 2:
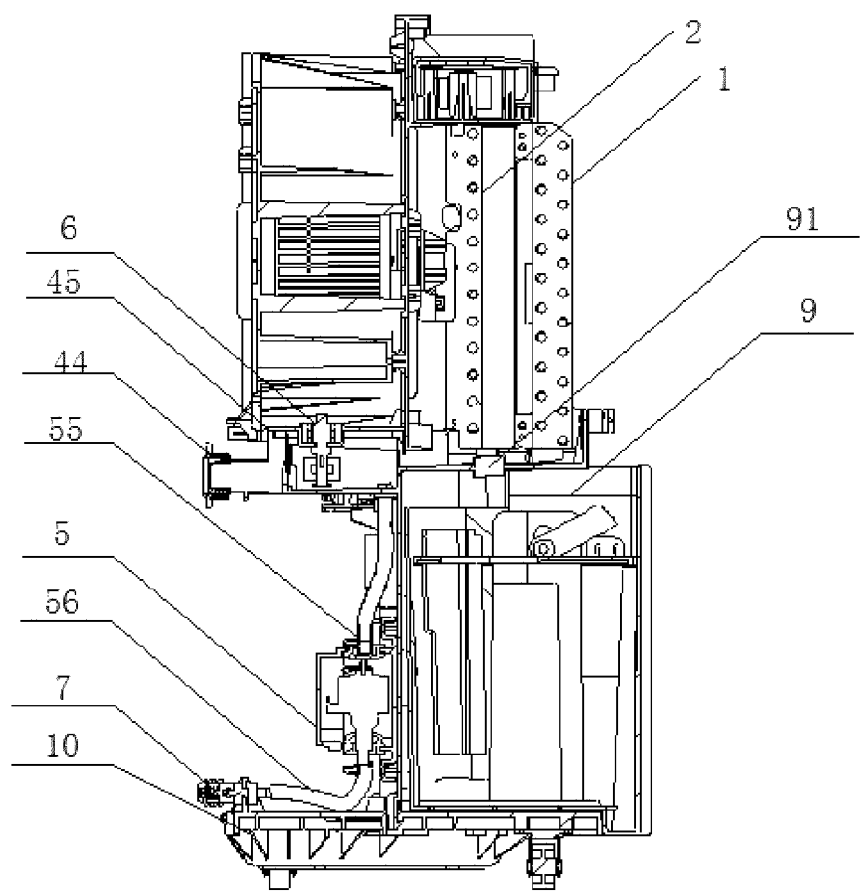
FIG. 2 shows another view of the exemplary dehumidifier.
Figure 4:
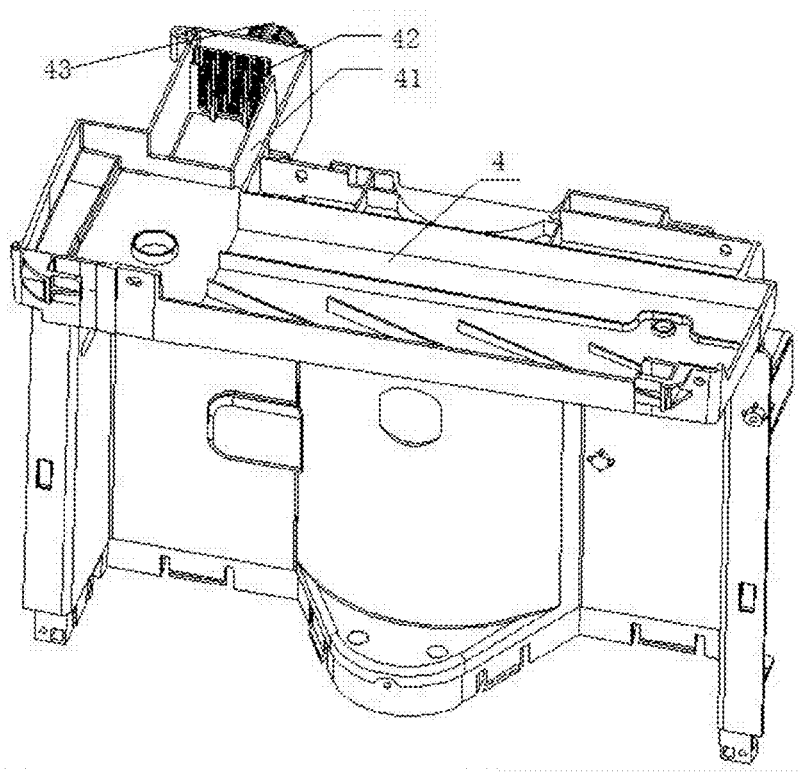
FIG. 4 shows the water receiving tray and the water discharging tank according to one embodiment of the present invention.

As shown in FIGS. 2 and 4, a water discharging tank 41 is extended from the water receiving tray 4 and in fluid communication with the latter. To facilitate collection of water from the water receiving tray 4, the water discharging tank 41 normally have a lower bottom than that of the water receiving tray 4, which is a widely used in the art. Under the water discharging tank 41 is provided a pump 5. The pump 5 is connected to the water discharging tank 41 through an inlet pipe 55 and to a fast coupler 7 disposed on the base 10 through an outlet pipe 56. In the present example, the water receiving tray 4 and the water discharging tank 41 are arranged to facilitate the mounting of the pump 5. It will be appreciated that other arrangements can also be possible. For example, the water discharging tank 41 can be disposed within the water receiving tray 4 or individually separated from the tray 4.

In FIG. 4, the water discharging tank 41 has a drainage opening 43 at one of sidewalls of the tank 41. Alternatively, the drainage opening 43 can also located at bottom of the tank 41. The drainage opening 43 is covered by a cover 44, as shown in FIG. 2.

The water collected in the water discharging tank 41 can either be discharged through the drainage opening 43 or through the pump 5.

With reference again to FIG. 4, in order to avoid blockage of the inlet pipe 55 caused by any articles unexpectedly entered into the water receiving tray 4, a filter 42 is provided in the water discharging tank 41. By removing the cover 44, the user can conveniently check if the filter 42 is blocked or not and, if positive, clean the filter.

Figure 3:
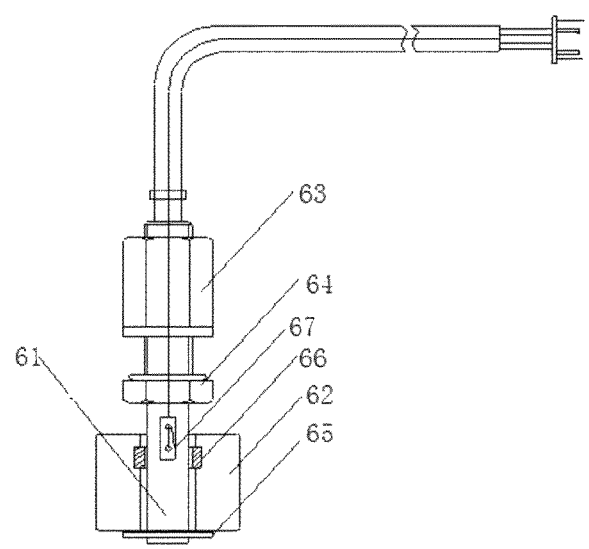
FIG. 3 shows the water level switch according to one embodiment of the present invention.

As shown in FIGS. 2 and 3, on the water discharging tank 41 is provided a tank lid 45 and a water level switch 6. The water level switch 6 comprises a floater 62 and a rod 61 passing through the floater 62. An upper nut 63 and a lower nut 64 are provided on the rod 61 to fix the water level switch 6 onto the tank lid 45. A part of the rod 61 is extended into the water discharging tank 41, specifically to a position below the lower nut 64. A blocker 65 is provided at a lower end of the rod 61 to prevent the floater 62 from detaching from the rod 61. The floater 62 is located between the lower nut 64 and the blocker 65 and movable up and down along the rod 61.

The floater 62 has a circular shape with a magnet 66 disposed within the floater 62. Correspondingly, the rod 61 has a closed and hollow structure and within which is disposed a magnetic field response switch 67 which is responsive to magnetic field to switch on and off. The magnetic field response switch 67 is electrically connected to the pump 5. When the water lever in the water discharging tank 41 arises, the floater 62 is also floating up along the rod 61. When the floater 62 floats to a position that is so close to the magnetic field response switch 67 that the latter captures the magnetic field of the magnetic 66 of the floater 62, the magnetic field response switch 67 will switch on and then the pump 5 starts to operate.

The floater 62 in the present example is made of foamed plastics, which is more resistant to water compared to conventional floaters. Even the present floater 62 is immersed in water for long time, the weight change thereof is much less than conventional ones, facilitating accurate control of the water lever switch. The magnetic field response switch 67 in the present example is enclosed in the rod 61, in order to prevent from contacting with water or wet environment, so as to avoid rusting.

Figure 5:
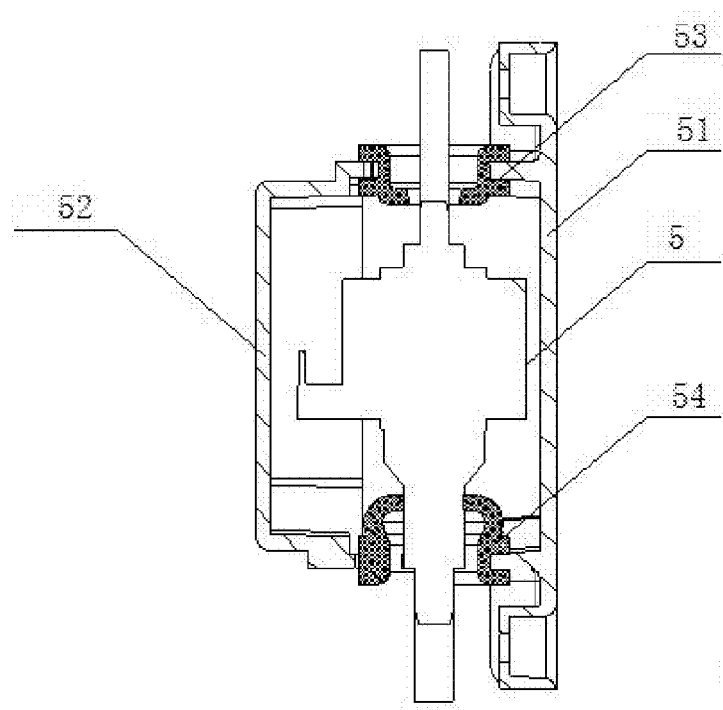
FIG. 5 shows the pump in relation to the other parts of a dehumidifier according to one embodiment of the present invention.

As shown in FIGS. 2 and 5, the pump 5 is disposed within a compartment formed by a protective casing 51 and a protective cover 52. The protective casing 51 is provided with openings for access of the outlet and inlet of the pump. An upper shock-absorbing cushion 53 and a lower shock-absorbing cushion 54 are provided at the openings. The shock-absorbing cushions 53, 54 are made of fire resistant materials.

The pump 5 always has a relatively higher working power, thus is risky in catching fire when short-circuit happens. The protective casing 51, the protective cover 52 and the shock-absorbing cushions 53, 54 can prevent spread of fire. In addition, the shock-absorbing cushions 53, 54 can absorb the vibration of pump 5 to avoid any adverse influence to the dehumidifier.

Figure 6:
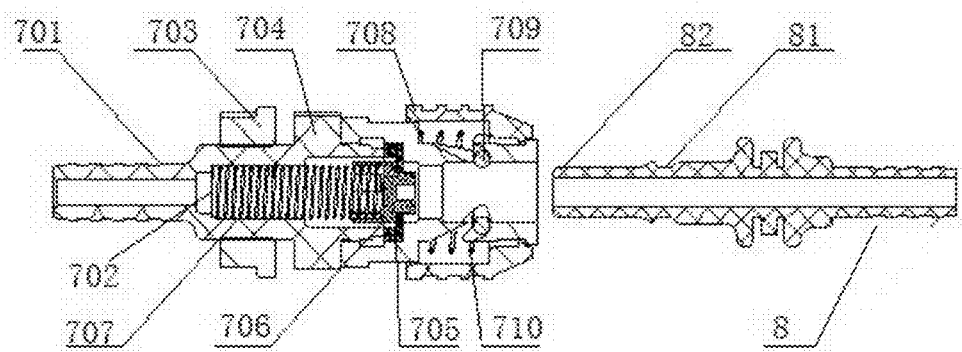
FIG. 6 shows the fast coupler according to one embodiment of the present invention.

As shown in FIG. 6, the fast coupler 7 comprises an inlet coupler 701 connected to the outlet pipe 56. The inlet coupler 701 has a hollow tubular structure and a cavity 702 with fixing ends is formed therein. A fixing nut 703 and a fixing end 704 are provided on the inlet coupler 701, through which the fast coupler 7 is mounted to the base 10 of the dehumidifier. In the cavity 702 of the inlet coupler 701 is provided a piston sleeve 705 having a circular shape. The piston sleeve 705 abuts against one fixing end of the cavity 702. The cavity 702 also comprises a piston 706 and a piston spring 707 disposed between the piston 706 and the other fixing end of the cavity 702. The inlet coupler 701 is attached with a fixing cover 708 at another end, which comprises a clamp shaft 709 and a fixing cover spring 710.

When the fast coupler 7 is not in use for water discharge, the piston 706 abuts against the piston sleeve 705 under the force of the piston spring 707, so that the fast coupler 7 does not allow water to flow through. To discharge water, a drainage coupler 8 is further needed. The drainage coupler 8 has a hollow tubular structure and a clamping element 81 is provided thereon. When the drainage coupler 8 is inserted into the fast coupler 7, an end 82 of the drainage coupler 8 will push on the piston 706 of the fast coupler 7 in order to open the latter. In the meanwhile, the clamping shaft 709 of the fast coupler 7 clamps the clamping element 81 of the drainage coupler 8 under the effect of the fixing cover spring 710, such that the drainage coupler 8 can not be easily separated from the fast coupler 7.

Figure 7:
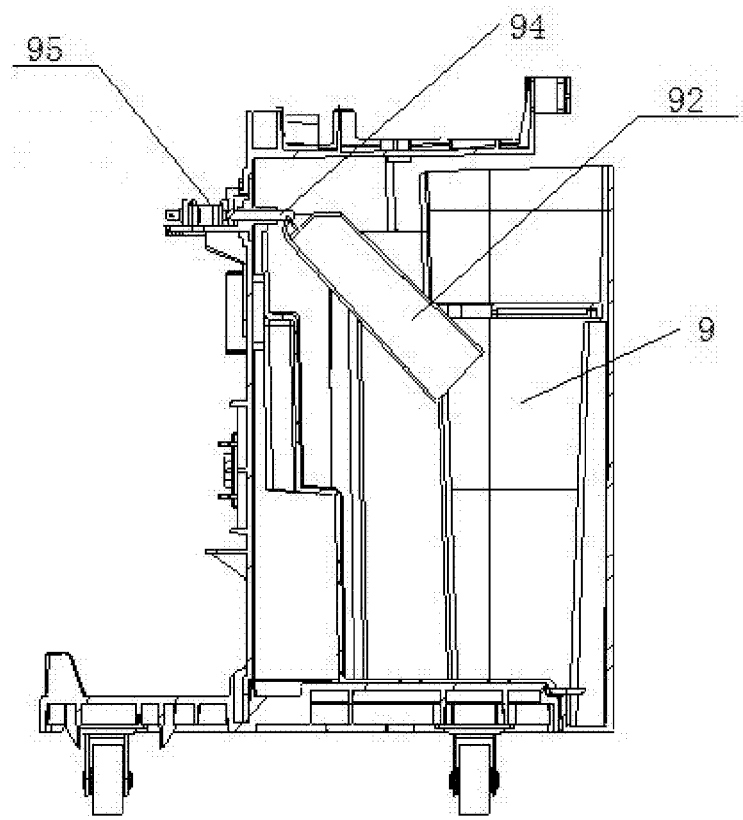
FIG. 7 shows the water collecting tank according to one embodiment of the present invention.

As shown in FIGS. 2 and 7, a water collecting tank 9 is provided below the water receiving tray 4. The water collecting tank 9 is in fluid communication with the water receiving tray 4 through a tank opening 91 which is higher than the water discharging tank 41. In the water collecting tank 9, a float rod 92 and a micro-switch 95 is provided. The float rod 92 is connected with a contacting rod 94 at one end. When the water collecting tank 9 has relatively less water, the contacting rod 94 abuts against the micro-switch 95 under the gravity force of the float rod 92, and the dehumidifier is in switch-on state. When the water in the water collecting tank 9 arises, the float rod 92 will also float so that the force applied on the contacting rod 94 is gradually decreased and finally as a result of which the contacting rod 94 is detached from the micro-switch 95, and the dehumidifier turns to a switch-off state.

In operation, the environment air passes by the evaporator 1 and condensed water is formed. The condensed water flows from the water receiving tray 4 into the water discharging tank 41 where the water can be discharged in two ways. One way is to discharge from the drainage opening 43. In this situation, the pump will not be used, and the water can be discharged from the drainage opening 43 of the water discharging tank 41 by removing the cover 44. The other way is to discharge by the pump. In this situation, when water in a water discharging tank reaches a predetermined level, the water level switch 6 is switched on and the pump 5 is started. By connecting the fast coupler 7 with the drainage coupler 8, the water in the discharging tank 41 is discharged by the pump 5 and the fast coupler 7.

Figure 8:
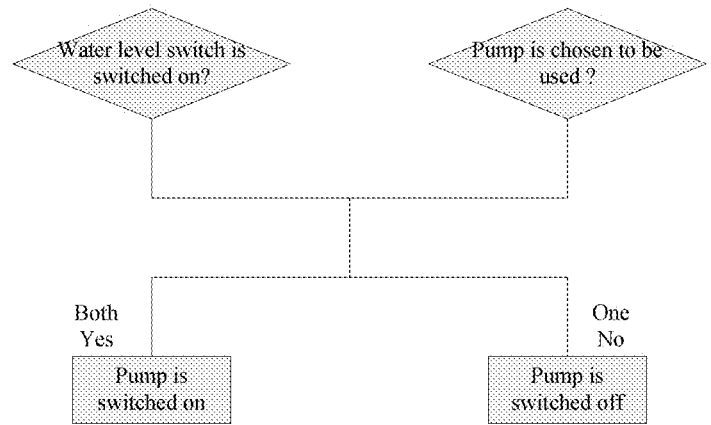
FIG. 8 shows process of the control of the pump according to one embodiment of the present invention.

When the pump 5 is used to discharge water, water drainage is controlled by two factors. As shown in FIG. 8, the switch on of the water level switch 6 will lead to start of the pump 5. However, water may not be discharged at this time. Only when the fast coupler 7 is open for water passing through, the water can be discharged.

A temperature control device can be provided to the pump of the present invention. The temperature control device has at least one temperature sensor consisted of thermistors. The temperature sensor collects the value of temperature of the pump in operation and sends a signal to switch off the pump when the value is equal or greater than a threshold and to switch on the pump when the value is less than the threshold. The temperature control device prevents from excess energy consumption during operation of pump and avoids causing fire due to long-term operation of the pump.

In addition, a monitoring system for the pump is provided by the present invention. The monitoring system comprises a signal receiving module, a timing module, a data analysis module and a pump control module. The signal receiving module is capable of collecting the 'on' and 'off' signals of the water level switch 6 and sending the signals to the timing module. The timing module receives the signals and starts to count when the 'on' signal of the water level switch is received and stopping counting when the 'off' signal is received. The timing data is then sent to the data analysis module. The data analysis module sends a power-off signal when the timing data is greater than a threshold value X. That is, if the timing module does not receive an 'off' signal within the threshold X, the data analysis module immediately sends a power-off instruction to the pump control module, and the latter will switch off the pump and send a warning signal to the user. If the timing module receives an 'off' signal within the threshold X, the timing module will stop counting and the data analysis module will send no instructions.

The threshold value X is generally determined by the volume of the water discharging tank. For example, in the present example, the water in the tank can generally drained within 3 minutes by the pump, the threshold value X is set to be 3. That is, when the pump is operated over 3 minutes, it will be stopped by the monitoring system. The system provides a excellent solution to safety issues caused by abnormal operation conditions including connection failures between parts, blockage of the filtering member or leakage of pipes.

When neither the pump 5 nor the drainage opening 43 is chosen for water discharging, the condensed water in the water receiving tray 4 will flow into the water collecting tank 9 through the tank opening 91. When the water in the collecting tank 9 reaches the float rod 92, the float rod 92 will float and enable the contacting rod to detach from the micro-switch 95 to switch off the dehumidifier. In this situation, the dehumidifier can only be switched on when the water in the water collecting tank 9 is discharged by the user.

Example 2

Figure 9:
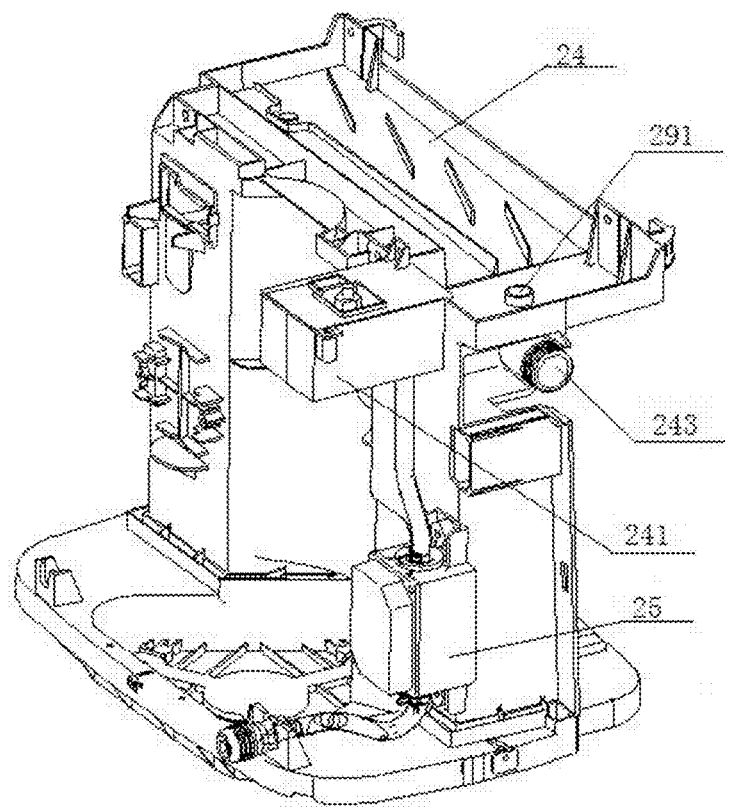
FIG. 9 is a perspective view of a humidifier according to another embodiment of the present invention.
Figure 10:
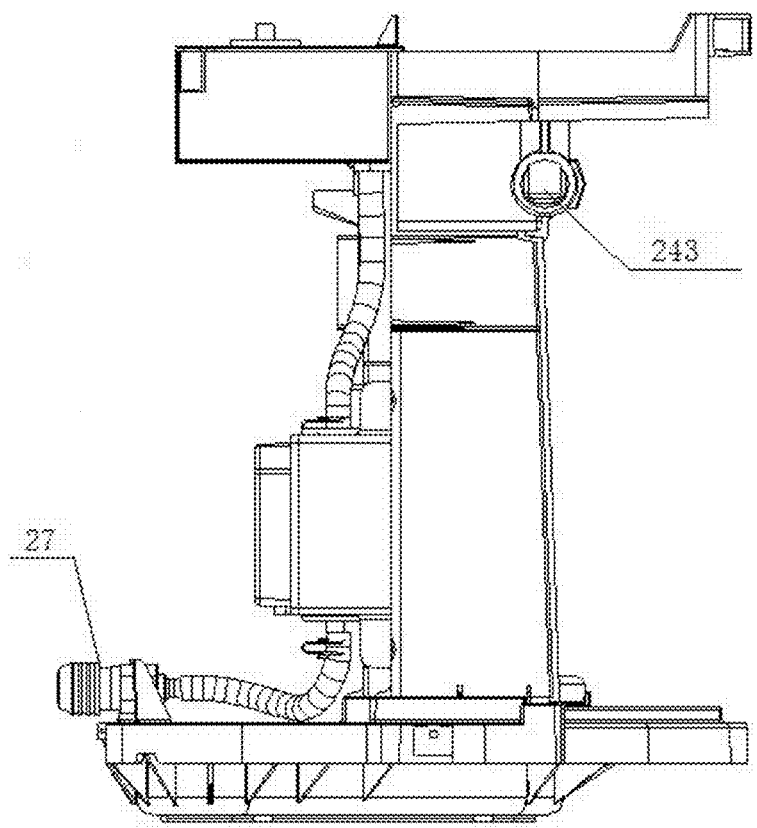
FIG. 10 is a left plan view of the humidifier shown in FIG. 9.
Figure 11:
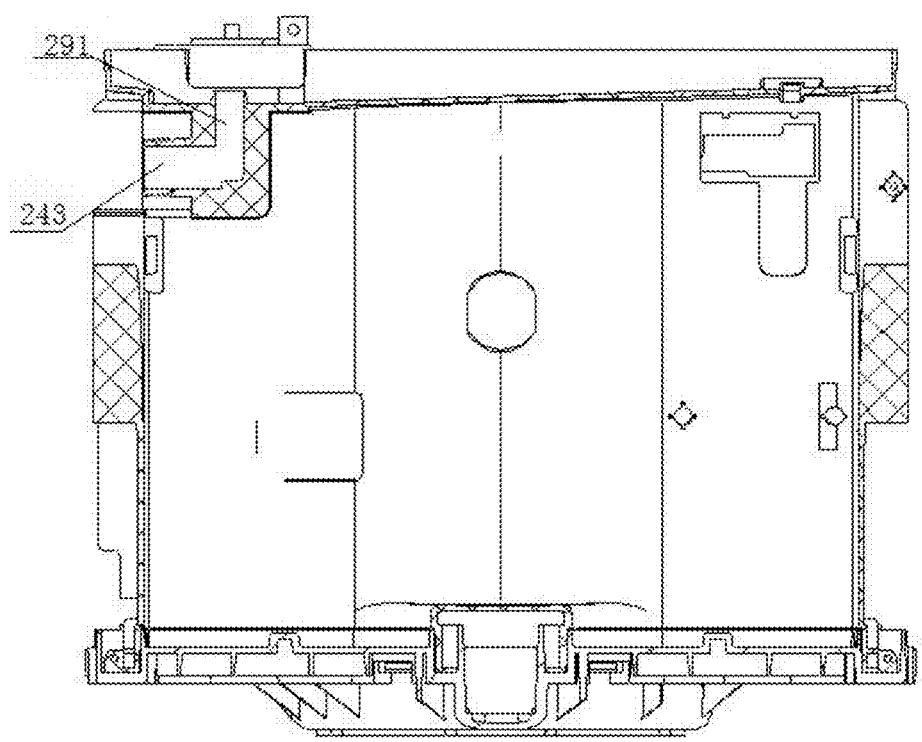
FIG. 11 is a sectional view of the humidifier shown in FIG. 9.

As shown in FIGS. 9 to 11, the present example is substantially identical to the Example 1 except that the water discharging tank 241 and the tank opening 291 is modified.

In the present example, no drainage opening is provided on the water discharging tank 241, i.e., the water discharging tank 241 is communicated with the water receiving tray 24 at one end and to the pump 25 through the pump interface at the other end.

The tank opening 291 is attached with a direct drainage opening 243. The direct drainage opening 243 is provided with screw thread at one end for connection with a hose. A water collecting tank is disposed below the drainage opening 243 with the inlet of the water collecting tank aligned with the drainage opening. The water collecting tank has a similar structure as that in Example 1.

During operation, the environment air passes by the evaporator and condensed water is formed. The condensed water flows from the water receiving tray 24 into the water discharging tank 241.

When the pump is used to discharge water, when water in a water discharging tank 241 reaches a predetermined level, the water level switch is switched on and the pump 25 is started. By connecting the fast coupler 27 with the drainage coupler, the water in the discharging tank 241 is discharged by the pump 25 and the fast coupler 27.

When the pump is not used to discharge water and the direct drainage opening 243 is used, the water will discharged through the tank opening 291 and the direct drainage opening 243. When neither pump nor direct drainage opening is used, the water will flows into the water collecting tank. When the water in the collecting tank reaches the float rod, the float rod will float and enable the contacting rod to detach from the micro-switch to switch off the dehumidifier. In this situation, the dehumidifier can only be switched on when the water in the water collecting tank is discharged by the user.

It should be understood that various example embodiments have been described with reference to the accompanying drawings in which only some example embodiments are shown. The present invention, however, may be embodied in many alternate forms and should not be construed as limited to only the example embodiments set forth herein.

What is claimed is:

1. A method for controlling a dehumidifier comprising:
    (a) providing a dehumidifier having a water level switch and pump, the water level switch comprising a closed hollow rod and a floater having a magnet and a hole, the closed hollow rod being disposed within the hole of the floater, the closed hollow rod further having a magnetic field response switch electrically connected with the pump, the magnetic field response switch being configured to switch on and start the pump when activated by a magnetic field;
    (b) switching the water level switch on and starting the pump when water in a water discharging tank reaches a predetermined level;
    (c) connecting a fast coupler with a drainage coupler; and
    (d) discharging water from the dehumidifier.

2. The method of claim 1, wherein the method further comprises:
    stopping the pump when the temperature of the pump is in excess of a predetermined value.

3. The method of claim 1, wherein the method further comprises:
    stopping the pump when the pump is operated over a predetermined time.

* * * * *